(12) United States Patent
Hastings

(10) Patent No.: US 10,979,395 B2
(45) Date of Patent: Apr. 13, 2021

(54) AUTOMATIC VIRTUAL PRIVATE NETWORK (VPN) ESTABLISHMENT

(71) Applicant: Fortinet, Inc., Sunnyvale, CA (US)

(72) Inventor: Eric C. Hastings, Dripping Springs, TX (US)

(73) Assignee: Fortinet, Inc., Sunnyvale, CA (US)

(*) Notice: Subject to any disclaimer, the term of this patent is extended or adjusted under 35 U.S.C. 154(b) by 133 days.

(21) Appl. No.: 16/385,178

(22) Filed: Apr. 16, 2019

(65) Prior Publication Data

US 2020/0336464 A1  Oct. 22, 2020

(51) Int. Cl.
*H04L 29/06* (2006.01)
*H04L 9/08* (2006.01)

(52) U.S. Cl.
CPC ........ *H04L 63/0272* (2013.01); *H04L 9/0841* (2013.01); *H04L 9/0891* (2013.01); *H04L 63/08* (2013.01); *H04L 63/20* (2013.01)

(58) Field of Classification Search
CPC ..... H04L 63/0272; H04L 63/08; H04L 63/20; H04L 9/0841; H04L 9/0891
See application file for complete search history.

(56) References Cited

U.S. PATENT DOCUMENTS

| | | | | |
|---|---|---|---|---|
| 7,478,167 B2* | 1/2009 | Ould-Brahim | ...... | H04L 12/4641 370/256 |
| 9,112,911 B1* | 8/2015 | Karhade | ............... | H04L 63/102 |
| 9,143,480 B2* | 9/2015 | Brousseau | ............ | H04L 49/354 |
| 10,491,603 B1* | 11/2019 | Robinson | ................ | H04L 63/20 |
| 2006/0282889 A1* | 12/2006 | Brown | ................ | H04W 12/001 726/15 |
| 2013/0298182 A1* | 11/2013 | May | ........................ | H04L 63/20 726/1 |
| 2016/0036514 A1* | 2/2016 | Saida | ...................... | H04B 7/155 455/405 |
| 2017/0061415 A1* | 3/2017 | Stewart | ................ | G06Q 20/206 |
| 2017/0366395 A1* | 12/2017 | Goldfarb | ............. | H04L 12/4641 |
| 2019/0230065 A1* | 7/2019 | Panchapakesan | ..... | H04L 63/107 |

* cited by examiner

*Primary Examiner* — Sarah Su
(74) *Attorney, Agent, or Firm* — HDC Intellectual Property Law, LLP

(57) ABSTRACT

Systems and methods for automatic VPN establishment are provided. According to one embodiment, a P1 message is received by a hub network device (ND) a remote device (RD) of a spoke. P1 specifies VPN connection attributes corresponding to a lowest ENC/AUTH suite supported by RD. A VPN tunnel entry is automatically created by ND based on the VPN connection attributes. A P2 message is transmitted by ND specifying ENC/AUTH attributes based on corresponding ENC/AUTH of the VPN connection attributes. A third message is received by ND from RD indicating a highest level ENC/AUTH suite supported by RD. ND determines its compatibility with the proposed ENC/AUTH suite. If compatible, ND transmits a random PSK to enable creation of a permanent tunnel and establishment of the VPN connection; otherwise, compatibility with a lower level ENC/AUTH suite is determined by RD iteratively reducing the proposed suite until a match is found.

12 Claims, 6 Drawing Sheets

AUTOMATIC VIRTUAL PRIVATE NETWORK (VPN) ESTABLISHMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to virtual private networks (VPNs), and more particularly to methods and systems for automatically establishing VPNs between computer networks.

Description of the Related Art

A computer network is a collection of interconnected computing devices that exchange data and share resources. In a packet-based network, such as the Internet, the computing devices communicate data by distributing the data among payloads of small messages called packets. The packets are individually routed across the network from a source device to a destination device, where the destination device extracts the data from the packets, and reassembles the data into its original form. Spreading the data among packets enables the source device to resend only those individual packets that may be lost during transmission.

A private network (e.g., an enterprise network) may include a number of devices, including computers, owned and/or administered by a single enterprise. These devices may be grouped into a number of site networks (e.g., a network associated with a headquarters and one or more networks associated with branch offices), which in turn may be geographically distributed over a wide area. Each site network may include one or more local area networks (LANs). A virtual private network (VPN) extends a private network across a public network (e.g., the Internet), and enables users to send and receive data across shared or public networks as if their computing devices were directly connected to the private network. In simple terms, a VPN creates a secure and encrypted connection that can be thought of as a tunnel between two computer systems (e.g., a user's computer and a server operated by the VPN service). Applications running across the VPN may therefore benefit from the functionality, security, and management of the private network.

A VPN provides an extension of a private intranet network across a less secure network, such as a public network (e.g., the Internet), and therefore helps create a secure private end-to-end connection. As such a VPN securely conveys information across a less secure network connecting remote users, branch offices, and business partners into an extended corporate network using a secure encryption tunnel that allows a private network to send data via a public network's connections. The secure encryption tunnel facilitates communication between two or more hosts in a secure manner by authenticating and encrypting each Internet Protocol (IP) packet of a communication session exchanged there between via the public network.

With the advent of VPN technology, enterprises are able to securely share data between site networks over a public network, such as the Internet. A VPN may be configured in a "hub-and-spokes" topology, where one site network acts as a hub, while the other site networks act as spokes to the hub. This configuration passes all data through the central hub site network; thereby isolating the spoke site networks and allowing communication between devices within different spoke site networks only through the hub site network. For example, the hub site network may be a network at the headquarters of an enterprise, while the spoke site networks might represent networks at geographically distributed branch offices, sales offices, manufacturing or distribution facilities, or other remote sites of the enterprise.

In some instances, remote sites may establish a spoke-to-spoke VPN tunnel to allow computing devices within the remote sites to securely handle time-sensitive communications, such as Voice over Internet Protocol (VoIP) or video conferencing, between the sites through the Internet or another public network infrastructure. A number of communication protocols have been developed for establishing a VPN tunnel. In general, these protocols allow network devices to establish the VPN tunnel as one or more secure data flows across the public network infrastructure. For example, the Internet Protocol Security (IPSec) protocol and the Secure Sockets Layer (SSL) protocol make use of cryptographic technology to establish network "tunnels," which tunnels allow packets conforming to other network protocols, such as Internet Protocol (IP) packets, to be encapsulated within encrypted packet streams flowing between the sites.

A typical VPN deployment requires extensive manual configuration by a network administrator in relation to VPN options and security parameters, and such options and/or security parameters are not always fully understood by the network administrator. For example, as discussed further below with reference to FIG. 1, a network administrator may be required to perform the following activities to establish a VPN connection between sites: (i) configuring a first side of an IPSec VPN at a main/hub location; (ii) configuring a second side of the IPSec VPN at a spoke location and verifying whether the proposals from the hub and the spoke match and whether the IPSec tunnel is correctly established, (iii) attempting to increase the encryption and authentication security levels at both sides, one level at a time, (iv) determining the maximum security level each side can agree upon and (v) running performance tests in both directions to determine whether the encryption/authentication levels are limiting bandwidth required for the communications at issue. The administrator is expected to repeat this process for each remote/spoke site connecting to the hub/main location. Furthermore, as the number of remote sites grows, the workload of manually configuring/deploying the VPN grows exponentially, and usually requires specialized systems to scale the roll-out.

There is therefore a need for a scalable and high performance automated VPN establishment that relieves the network administrator from performing extensive setup and configuration and also facilitates the identification and balancing of optimal VPN settings and high security.

SUMMARY

Systems and methods are described for automatic VPN establishment. According to one embodiment, a phase 1 security parameter proposal message is received by a network device associated with a first site of a private network from a remote device associated with a second site of the private network. The phase 1 security parameter proposal message specifies VPN connection attributes corresponding to a lowest encryption and authentication suite supported by the remote device. A VPN tunnel entry is automatically created by the network device based at least in part on the VPN connection attributes. A phase 2 security association proposal message is generated by the network device specifying encryption and authentication attributes based on corresponding encryption and authentication attributes of the VPN connection attributes. Responsive to processing of the second message by the remote device, a third message is received by the network device from the remote device. The third message indicating a highest level encryption and authentication suite that the remote device is able to support. A determination is made by the network device regarding whether the network device is compatible with the highest level encryption and authentication suite. When the determination is affirmative, a random pre-shared key (PSK) is transmitted to replace a temporary PSK received from the remote device as part of a connection request message so as to enable creation of a permanent tunnel and establishment of the VPN connection. When the determination is negative, compatibility of the network device with a lower level encryption and authentication suite is determined by the remote device iteratively reducing a proposed level of encryption and authentication suite until a match is found between the remote device and the network device.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
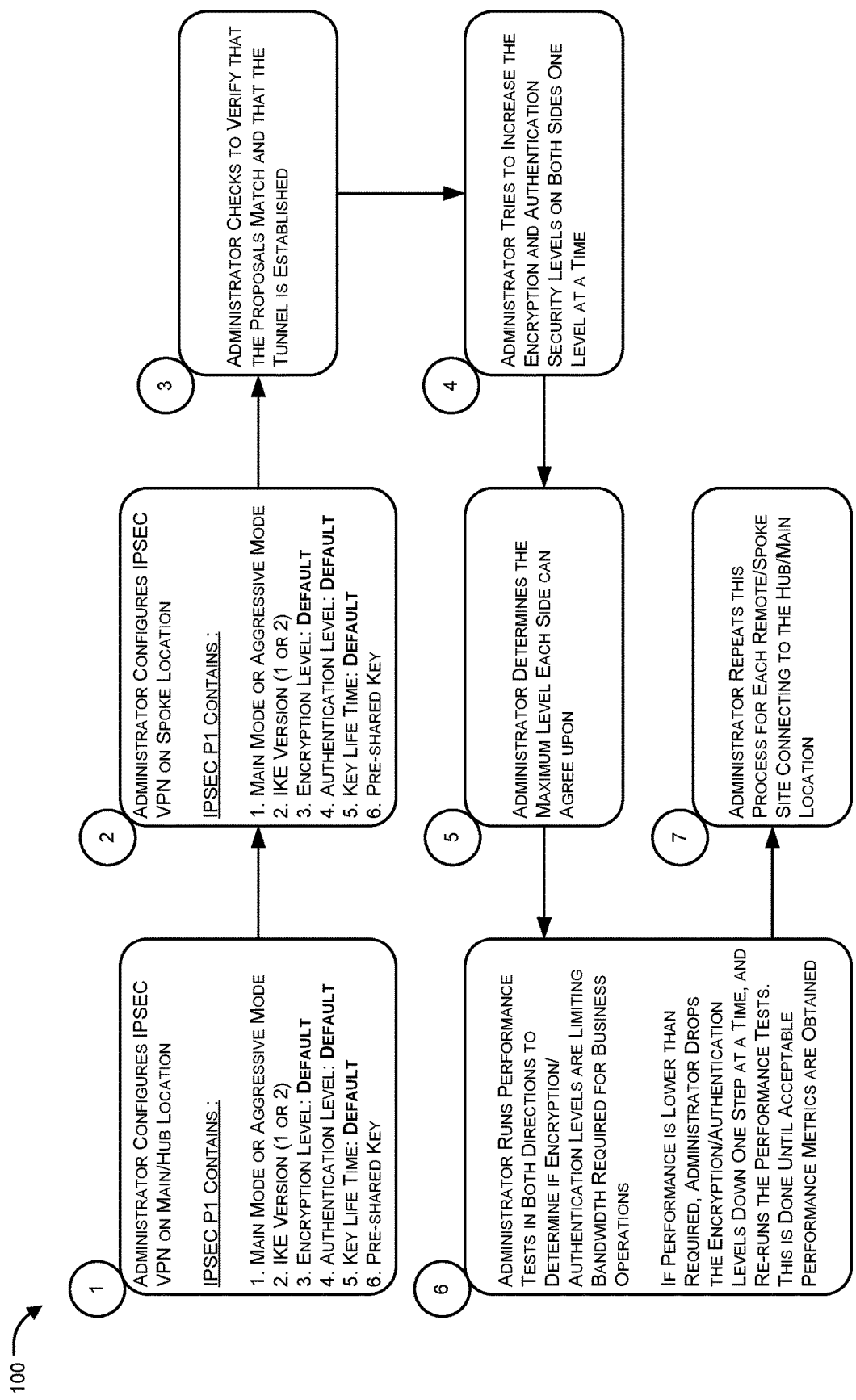
FIG. 1 is a flow diagram illustrating an existing manual process for establishing virtual private network (VPN) connections.

Systems and methods are described for automatic VPN establishment. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present invention with appropriate special purpose or standard computer hardware to execute the code contained therein. An apparatus for practicing various embodiments of the present invention may involve one or more computers (e.g., physical and/or virtual servers) (or one or more processors within a single computer) and storage systems containing or having network access to computer program(s) coded in accordance with various methods described herein, and the method steps associated with embodiments of the present invention may be accomplished by modules, routines, subroutines, or subparts of a computer program product.

Systems and methods are described for automatic VPN establishment. In an aspect, a method for automatically establishing a virtual private network (VPN) connection can include: receiving, by a network device (e.g., a first VPN gateway) associated with a first site of a private network, from a remote device (e.g., a second VPN gateway) associated with a second site of the private network, a phase 1 security parameter proposal message specifying various VPN connection attributes corresponding to a lowest encryption and authentication suite supported by the remote device; automatically creating, by the network device, a VPN tunnel entry based at least in part on the various VPN connection attributes; generating, by the network device, a phase 2 security association proposal message (second message) specifying encryption and authentication attributes based on corresponding encryption and authentication attributes of the various VPN connection attributes; responsive to the second message, receiving, at the network device, from the remote device, a third message indicative of a highest level of encryption and/or authentication (e.g., a highest encryption and authentication suite) that the remote device is able to support; and determining, at the network device, whether it is able to support the proposed level of encryption and/or authentication, wherein if the network device is capable of supporting the proposal by the remote device, it can transmit a random pre-shared key (PSK) to replace a temporary PSK received from the remote device as part of a connection request message so as to enable creation of a permanent tunnel, and wherein if the network device is not capable of supporting the proposal by the remote device, compatibility of the network device with next highest levels of encryption and/or authentication can be determined by the remote side trying the next highest level settings it can support until a match is found or no agreement is made.

In another aspect, the first set of VPN connection attributes can be selected from any or a combination of an IP address of the remote device, a fully qualified domain name (FQDN), a unique VPN connection name, a destination IP address, attributes of supported authentication, attributes of supported encryption, a randomized key life timer, a supported Diffie-Hellman (DH) group, and the temporary pre-shared key (PSK).

In yet another aspect, the remote device can configure the permanent tunnel based on the random PSK, the second message, and the connection request message.

In an aspect, the method can further include the steps of: performing, at the network device, a connection speed test between the remote device and destination such that: if the connection speed meets or exceeds a minimum speed threshold, the permanent tunnel can be finalized so as to complete the VPN connection establishment; otherwise, if the connection speed is lower than the minimum speed threshold, levels of encryption and/or authentication can be iteratively revised between the remote device and the network device until the minimum speed threshold is achieved.

In another aspect, the connection request message can be authorized before the VPN tunnel entry is created.

In yet another aspect, the network device can be any or a combination of a hub, a network security device, a router, and a gateway device.

In an aspect, the present disclosure relates to a network security device for automatically establishing a virtual private network (VPN) connection that includes: a non-transitory storage device having embodied therein one or more routines operable to automatically establish a virtual private network (VPN) connection; and one or more processors coupled to the non-transitory storage device and operable to execute the one or more routines, wherein the one or more routines can include: a connection request receive module, that when executed by the one or more processors, can receive, from a remote device intending to establish the VPN connection, a connection request message (P1) comprising a first set of VPN connection attributes corresponding to a lowest encryption and authentication suite supported by the remote device; a VPN tunnel entry creation module, that when executed by the one or more processors, can automatically create, at the network device, based on at least a part of the first set of VPN connection attributes, a VPN tunnel entry; and a VPN settings message generation module, that when executed by the one or more processors, can generate, at the network device, a second message (P2) having one or more attributes that are common with the first set of VPN connection attributes, the second message indicative of attributes based on which the VPN connection is established; and an encryption and authentication level negotiation module, that when executed by the one or more processors, responsive to the second message, can receive, from the remote device, a third message indicative of the highest levels of encryption and/or authentication that the remote device is able to support, and can determine if the network device is compatible with the proposed levels of encryption and/or authentication, wherein if the network device is determined to be compatible, it can transmit a random pre-shared key (PSK) to replace a temporary PSK received from the remote device as part of the connection request message so as to enable creation of a permanent tunnel, and wherein if the network device is determined to be incompatible with the proposed levels of encryption and/or authentication, compatibility of the network device with next highest levels of encryption and/or authentication can be determined.

In another aspect, the network device can further include a speed test based VPN connection establishment module, that when executed by the one or more processors, can perform a connection speed test between the remote device and destination device such that if the connection speed is above a minimum speed threshold, the permanent tunnel can be finalized so as to complete the VPN connection establishment, else if the connection speed is lower than the minimum speed threshold, levels of encryption and/or authentication can be iteratively revised between the remote device and the network device till the minimum speed threshold is achieved.

In an aspect, the present disclosure relates to a system for automatically establishing a virtual private network (VPN) connection that includes: a connection request receive module, which when executed by the one or more processors, receives, from a remote device associated with a second site of the private network, a phase 1 security parameter proposal message specifying various VPN connection attributes corresponding to a lowest encryption and authentication suite supported by the remote device; a VPN tunnel entry creation module, which when executed by the one or more processors, automatically creates a VPN tunnel entry based at least in part on the various VPN connection attributes; and a VPN settings message generation module, which when executed by the one or more processors, generates a phase 2 security association proposal message specifying encryption and authentication attributes based on corresponding encryption and authentication attributes of the various VPN connection attributes; and an encryption and authentication level negotiation module, which when executed by the one or more processors, upon generation of the second message, receives, from the remote device, a third message indicative of highest levels of encryption and/or authentication that the remote device is able to support, and determines if the network device is compatible with the received levels of encryption and/or authentication such that if the network device is determined to be compatible, the network device transmits a random pre-shared key (PSK) to replace a temporary PSK received from the remote device as part of the connection request message so as to enable creation of a permanent tunnel, and if the network device is determined to be incompatible, compatibility of the network device with next highest levels of encryption and/or authentication is determined.

In another aspect, the system can further include a speed test based VPN connection establishment module, that when executed by the one or more processors, can perform a connection speed test between the remote device and destination device such that if the connection speed is above a minimum speed threshold, the permanent tunnel can be finalized so as to complete the VPN connection establishment, else if the connection speed is lower than the minimum speed threshold, levels of encryption and/or authentication can be iteratively revised between the remote device and the network device till the minimum speed threshold is achieved.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" or "network security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

FIG. 1 is a flow diagram 100 illustrating an existing manual process for establishing a virtual private network (VPN) connection. A VPN tunnel is typically established in two phases: Phase 1 and Phase 2 that have various settings/ parameters. Except for IP addresses, the settings have to match at both VPN gateways (not shown). In phase 1, the two VPN gateways exchange information about encryption algorithms that they respectively support, and then establish a temporary secure connection to exchange authentication information. Settings for phase 1 include the remote spoke address, a pre-shared key PSK (that must be same at both hub as well as spoke/client end, and is used to encrypt phase 1 authentication information), and a local interface (s network interface that connects to the other VPN gateway). Further, the hub and the spoke can exchange phase 1 parameters in either main mode or aggressive mode (in case Internet Key Exchange (IKE) version 2 is selected, IKE being elaborated further below, this does not apply since IKE2 is available only for route-based configurations). In main mode, the Phase 1 parameters are exchanged in multiple rounds with encrypted authentication information while in aggressive mode, the Phase 1 parameters are exchanged in a single message with unencrypted authentication information.

During Phase 1, the hub and the spoke (that may also be two peers) authenticate each other and negotiate a way to encrypt further communications for the duration of the session. This is done using IKE parameters that determine, for instance, which encryption algorithms (ENC) may be applied for converting messages into a form that only the intended recipient can read, which authentication hash (AUTH) may be used for creating a keyed hash from a pre-shared or private key and which Diffie-Hellman group (DH Group) will be used to generate a secret session key.

As is known, Diffie-Hellman key exchange (DH) is a method of securely exchanging cryptographic keys over a public channel. The Diffie-Hellman key exchange method allows two parties that have no prior knowledge of each other to jointly establish a shared secret key over an insecure channel. This key can then be used to encrypt subsequent communications using a symmetric key cipher.

All other Phase 1 settings have default values. Encryption level and authentication level configure the types of encryption to be used, while a key life time setting in the Phase 1 proposal determines the amount of time before the Phase 1 key expires.

The phase 2 process is similar to Phase 1, wherein the two VPN gateways (hub and spoke, or two peers) exchange information about the encryption algorithms that they support for Phase 2. If both gateways have at least one encryption algorithm in common, a VPN tunnel can be established.

As illustrated in FIG. 1, the present process for establishing a VPN connection is a highly manual one, requiring intervention of an administrator at several points. To setup a VPN connection, the administrator firstly configures an Internet Protocol Security Protocol (IPSec) VPN on a main/ hub location of a planned VPN as shown at step 1. During this setup, the administrator sets up various parameters of IPSec on the hub, such parameters constituting a proposal illustrated as IPSec P1 that contains various parameters as elaborated above, consistent with the corresponding properties/capabilities of the hub location. Thereafter, as illustrated at step 2, the administrator needs to setup the same proposal at a spoke location, according to the properties/ capabilities of the spoke location. At step 3, the administrator checks to verify that the proposals match in various parameters and that a tunnel is established. If the tunnel is established, that means at least the selected encryption algorithm is common to both the hub and the spoke.

However, since the parameters may have been arbitrarily selected by the administrator, the encryption and authentication security levels thus achieved may not be optimal (e.g., the highest commonly supported encryption and authentication suite) and some improvements may be possible. Hence, as illustrated at step 4, the administrator tries to increase encryption and authentication security levels at both ends (hub and spoke, that is) one level at a time, the objective being to achieve the maximum commonly supported encryption and authentication security levels.

By manually increasing the encryption and authentication security levels at both ends, the administrator manually identifies/determines the maximum such levels the two sides can agree upon, as illustrated in Step S.

However, the levels so determined may use excessive computing resources/bandwidth and so may limit bandwidth required for suitable business operations. To determine if this is the case, the administrator runs a performance test in both directions (that is, communications/data interchange between hub and spoke), and if the measured performance is lower than desired drops the encryption/authentication levels down one step at a time until acceptable performance metrics are observed, as illustrated at step 6.

All these steps then need to be repeated at each spoke connected to the hub/main location, as illustrated at step 7.

As can be readily appreciated by those skilled in the art, the present approach for setting up VPNs is highly manual, potentially error prone, and requires many iterative steps. Therefore, is would be desirable to have an automatic virtual private network (VPN) establishment method that relieves the network administrator from performing extensive setup and configuration and that also automatically identifies and balances optimal VPN settings and high security.

Figure 2:
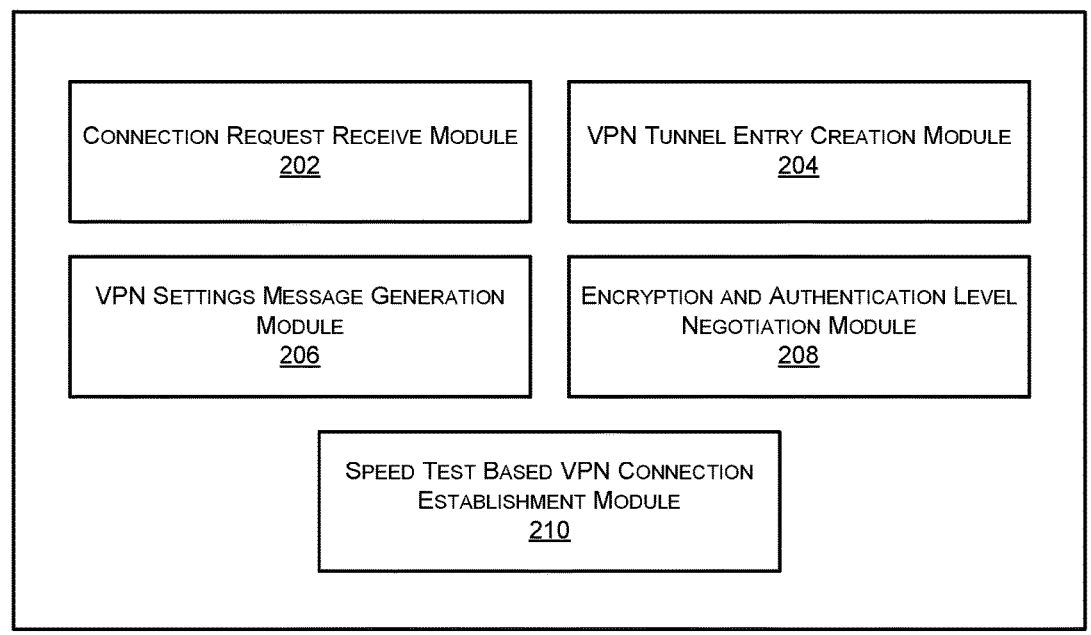
FIG. 2 illustrates exemplary functional modules of a system that facilitates automatic VPN establishment in accordance with an embodiment of the present invention.

FIG. 2 illustrates exemplary functional modules of a system 200 that facilitates automatic VPN establishment in accordance with an embodiment of the present invention. System 200 may represent a network device (e.g., a router) or a network security device (e.g., a UTM appliance or VPN gateway) configured for operation at a hub. Those skilled in the art will appreciate that a corresponding system (not shown) is assumed to be configured for operation at the remote side/a spoke.

In the context of the present example, system 200 includes software that may be represented in the form of multiple modules or routines, including a connection request receive module 202, a VPN tunnel entry creation module 204, a VPN settings message generation module 206, an encryption and authentication level negotiation module 208 and a speed test based VPN connection establishment module 210 that may be executed by one or more processors of the network security device to perform automated VPN establishment. Those skilled in the art will appreciate more or fewer modules may be implemented as a matter of design choice and that the modules depicted in FIG. 2 and the distribution of functionality among these modules is a non-limiting example of one of many possible configurations of system 200.

Continuing with the present example, connection request receive module 202 is operable to receive, from a remote device (e.g., a network security device associated with the spoke) intending to establish the VPN connection, a connection request message (P1) including a first set of VPN connection attributes corresponding to a lowest encryption and authentication suite supported by the remote device. In one embodiment, P1 may be generated by the remote device responsive to a user initiating the VPN connection from the remote side/spoke to the network device using a web-based graphical user interface, for example, and specifying the IP address or FQDN of the hub network device and a connection name.

VPN tunnel entry creation module 204 is responsible for automatically creating, based on at least a part of the first set of VPN connection attributes, a VPN tunnel entry.

VPN settings message generation module 206 is responsible for generating a second message (P2) having one or more attributes that are common with the first set of VPN connection attributes. The second message is indicative of attributes based on which the VPN connection is established.

Encryption and authentication level negotiation module 208 is operable to receive, from the remote device, a third message indicative of a highest level of encryption and/or authentication that the remote device is able to support, and in response to receipt of the third message to determine whether the network device that the system is configured in, is compatible with the received levels of encryption and/or authentication. If so, encryption and authentication level negotiation module transmits a random pre-shared key (PSK) to replace a temporary PSK received from the remote device as part of the connection request message so as to enable creation of a permanent tunnel; otherwise, when the network device is determined to be incompatible with the encryption and/or authentication proposal contained in the third message, the proposal is not accepted and negotiation continues responsive to the remote side proposing its next highest levels of encryption and/or authentication.

In one embodiment, the first set of VPN connection attributes can be selected from any or a combination of an IP address of the remote device, a fully qualified domain name (FQDN), a unique VPN connection name, a destination IP address, attributes of supported authentication, attributes of supported encryption, a randomized key life timer, a supported Diffie-Hellman (DH) group, and a temporary pre-shared key (PSK).

In yet another aspect, the remote device can configure the permanent tunnel based on the random PSK, the second message, and the connection request message.

Assuming matching settings are found, speed test based VPN connection establishment module 210, then performs a connection speed test between the two sites (i.e., the remote site/spoke and the hub) to determine whether the connection speed between the two sites meets or exceeds a predetermined or configurable minimum speed threshold. If so, a permanent tunnel can be finalized so as to complete the VPN connection establishment; otherwise, if the connection speed is lower than the minimum speed threshold, levels of encryption and/or authentication can be iteratively revised between the remote device and the network device until the minimum speed threshold is achieved.

In an exemplary embodiment, a VPN may be desired to be established between a remote device (RD) associated with a spoke and a network device (ND) associated with the hub. As a first step, proposed system can enable the RD to send a connection request message (P1) comprising a first set of VPN connection attributes corresponding to a lowest encryption and authentication suite supported by the remote device. For instance, the connection request message may include the destination IP address or corresponding fully qualified domain name (for instance, 212.58.224.0 that points to www.BBC.ccom) of the remote device (for identification proposes), a lowest encryption standard supported by the RD (for instance, DES), a lowest authentication standard supported by the RD (for instance, MD5), a lowest supported DH group (for instance, DH group1). As can be seen, the encryption, authentication and DH group are not very strong initially. Their purpose is simply to establish a temporary connection since the network device (ND) will have at least these attributes. Besides, message P1 can include a temporary pre-shared key (for instance, ABC!1@23) that can have a randomized key life timer, for instance, 86,400 (24 hours) that should be more than sufficient for the temporary connection.

Since the ND has the same attributes, a preliminary VPN can be established between the RD and the ND. The system of the present disclosure can enable the ND to accordingly send a message to the RD.

Thereafter, in one embodiment, the system can enable the RD to send a message to the ND, proposing the highest levels of encryption, authentication and DH group the RD can support. Upon receipt, the system of the present disclosure can determine whether the ND can support the same attributes. If so, the ND can be configured accordingly and the system can enable the ND to send to the RD a random PSK. Thereafter, the system can configure the RD also to same attributes and the RD can use the random PSK to bring up a new permanent tunnel. Those skilled in the art will appreciate that a VPN tunnel so established will have the highest mutually supported level of security.

However, if the ND cannot be set to the highest attributes as proposed by the RD, the system can enable the RD to send the next highest attributes repeating the procedure above until a match is found or no agreement can be found. For example, assuming mutually agreeable settings are supported on both ends, the procedure can be iterated until both the RD and the ND have arrived at a common set of encryption, authentication and DH group attributes that provide the highest security between the two and accordingly a permanent VPN tunnel can be setup between the RD and the ND.

In an exemplary embodiment, such attributes can be encryption standard of AES 256, authentication of SHA 512 and DH group 21. As can be readily appreciated, such attributes can provide a much higher level of security to the permanent VPN tunnel formed as compared to those used for the temporary tunnel.

Thereafter, the system can check whether the speed between the RD and the ND is optimal. If not, the levels of encryption/authentication can again be iteratively revised between the ND and the RD until a minimum optimal speed threshold, set by the network administrator, for example, is met.

Figure 3:
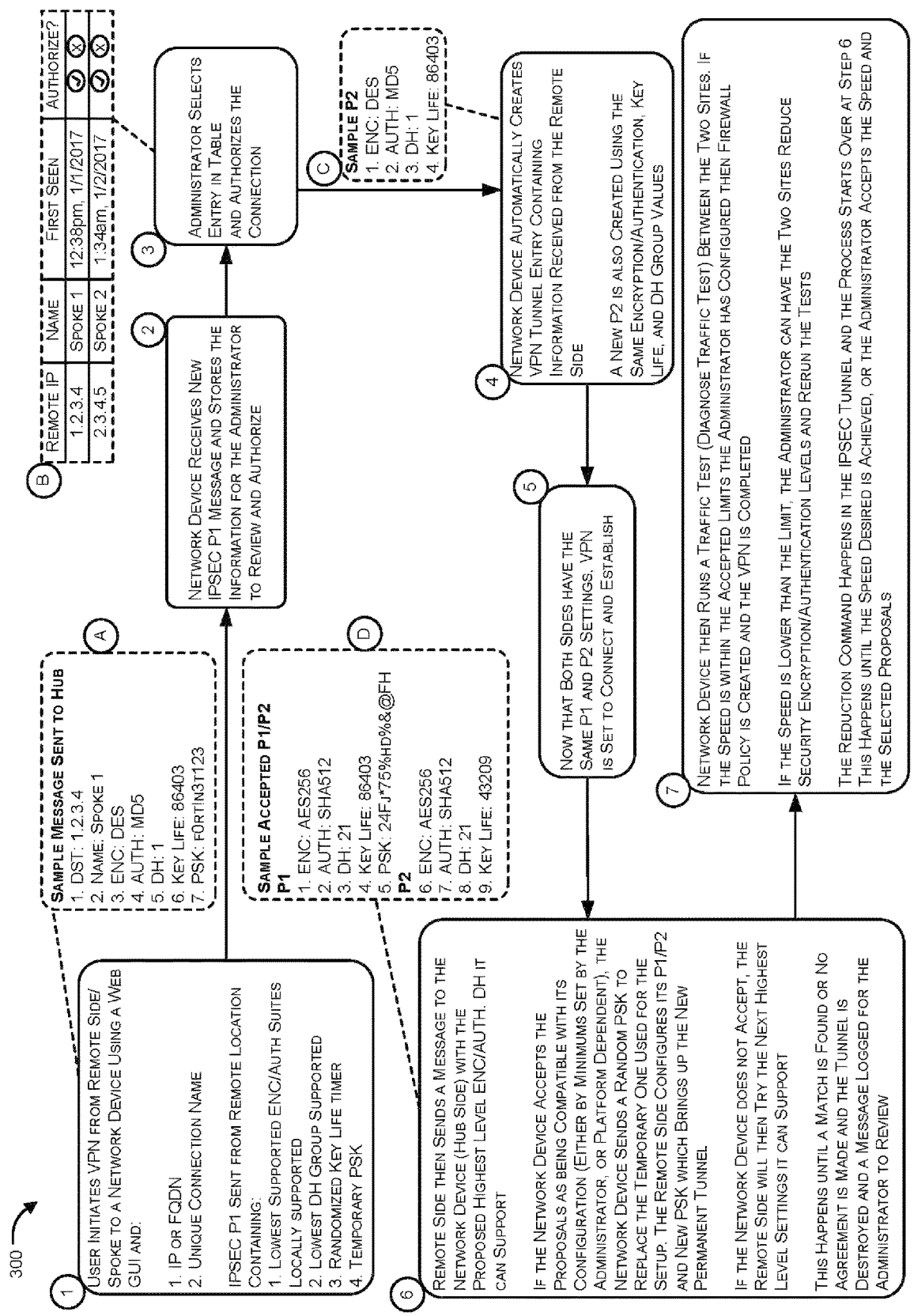
FIG. 3 is a flow diagram illustrating automatic VPN establishment processing in accordance with an embodiment of the present invention.

FIG. 3 is a flow diagram 300 illustrating automatic VPN establishment processing in accordance with an embodiment of the present invention.

As illustrated in FIG. 3, system of the present disclosure enables a user to initiate a VPN (make a VPN request) from a remote side/spoke, as illustrated at block 1. In one embodiment, an appropriate web-based graphical user interface (GUI) can be provided on the user's computing device for this purpose. The VPN request can carry the IP address or fully qualified domain name (FQDN) of the hub network device and a unique connection name for the VPN connection. The VPN request sent from the remote location can also include a Phase 1 security parameter proposal message/ connection request message shown as P1 (that can be based on IPSec) that can contain lowest supported encryption (ENC) and authentication (AUTH) suites locally supported, lowest DH (Diffie-Hellman) group supported, a randomized key life timer, and a temporary pre-shared key (PSK).

IPsec P1 is then sent to the hub/network device. For purposes of illustration, the message can include DST (i.e., a destination IP address) as 1.2.3.4, Name as "spoke 1," encryption protocol ENC as "DES," authentication protocol AUTH as "MD5," Diffie-Hellman group as 1, Key Life as 86403 seconds, and PSK (pre-shared key) as "FORT!N3T123," as illustrated at A in FIG. 3. At this point in time, PSK represents a temporary PSK as noted above.

The network device (also referred to as ND) at the hub can receive the message P1, and store the information for the administrator to review and authorize via an appropriate GUI, as illustrated at block 2. In a similar manner, the ND can receive VPN requests from other associated spokes and can maintain such information in a table as illustrated at B.

Further, at any time the administrator can select a corresponding entry in table B pertaining to the spoke with which the administrator wishes to authorize establishment of a VPN connection, as illustrated at block 3.

Thereafter, the ND can automatically create a VPN tunnel entry containing information received from the remote side/spoke that the ND can receive from the corresponding entry in table B as shown at block 4. A new message P2 (that can be interchangeably termed as Phase 2 security association proposal message or second message) can also be created by the ND as illustrated at block 4, based upon information received from the remote side/spoke (which may also be referred to as remote device or RD). Message P2 indicates the settings at which the network security device has been set.

For purposes of illustration, as shown at block C, message P2 can have an encryption protocol ENC as "DES," authentication protocol AUTH as "MD5," Diffie-Hellman group as 1 and Key Life as 86403 seconds. As can be seen, these parameters have the same values as those in corresponding parameters of message P1. It should be appreciated that since values in P2 for ENC/AUTH suites and DH group are the lowest supported by the computing device/remote device (RD), the ND must have at least these values.

Hence, in this manner, both the spoke and the hub can be configured with same P1 and P2 settings and so, VPN is set to connect and establish, as illustrated at block 5.

Once a VPN is established, the remote side (spoke side) can send a message (that can be termed as a third message or proposal) to the ND (hub side) with the proposed highest level encryption protocol (ENC), authentication protocol (AUTH), and Diffie-Hellman group (DH) it can support, as illustrated at block 6. If the ND accepts the proposal as being compatible with its configuration (either according to minimums that can be established by the administrator, or which may be platform dependent), the ND can send a random PSK to replace the temporary PSK used for the VPN setup. The RD can accordingly configure its P1/P2 parameters with the new PSK to create a new permanent tunnel. However, if the ND does not accept the proposal, the remote side can then try the next highest level settings it can support and accordingly send a new third message/proposal and the procedure is repeated until (i) a match is found (such a match being the highest level settings both the remote side (spoke/computing device) and the hub side (network device) can support or (ii) no agreement is made.

When common settings are found between the two sites, a new permanent tunnel can be formed with these settings. As illustrated at block D, the final P1 and P2 settings agreed upon contain the same settings for level encryption protocol (ENC), authentication protocol (AUTH) and Diffie-Hellman group (DH). As noted above, the PSK can be different from the temporary PSK established at block 1.

When no match can be found or no agreement is made between the two sites, the tunnel made using the temporary PSK can be destroyed and a message can be logged for the administrator to review, as illustrated at block 6.

As those skilled in the art will appreciate a tunnel that is formed using the highest level settings that both the remote side (spoke/remote device) and the hub side (network device) can support (as elaborated above) may not be very efficient, as levels so identified may use excessive computing resources and may result in lower speed communications between the two sites than required for effective business operations. In order to arrive at the most efficient settings, the ND can automatically run a traffic test (diagnosis traffic test) between the two sites (spoke and hub). When the traffic speed is within accepted limits that the administrator has created/configured, a firewall policy can be created and the VPN can be completed/confirmed. On the other hand, if the speed is lower than the limit set by the administrator, the two sides may be automatically caused to negotiate a reduced security encryption/authentication level and a new VPN tunnel can accordingly be formed in accordance with the procedure elaborated in block 6 and similarly tested again at block 7. Once the desired speed is achieved (e.g., as configured by the administrator), the firewall policy can be accordingly completed and the VPN is completed.

As can be appreciated, the method of the present disclosure as elaborated above takes a very different approach as compared to the prior manual method as described with reference to FIG. 1. For example, the prior art techniques require the administrator to (i) manually configure an IPsec VPN on a hub and then on a spoke using default settings of encryption level, authentication level and key life time on both hub and spoke, and the same pre-shared key on both hub and spoke, (ii) check whether the proposals match and whether a VPN tunnel is established, and then (iii) iteratively increase the encryption and authentication levels on both sides one level at a time to determine the maximum level each side can agree upon. Thereafter, the administrator iteratively runs performance tests (traffic tests) between the spoke and the hub, dropping/reducing encryption/authentication levels at both sides until performance metrics (such as speed, for instance) are within acceptable limits.

In contrast, according to one embodiment, the automated method proposed herein sets a spoke at its lowest supported encryption and authentication levels, creates a temporary PSK, and transfers such information using the lowest DH group supported by the spoke to establish the same settings at the hub and then creates a VPN. Thereafter, the proposed method enables the spoke to propose its highest level of encryption, authentication, and DH group it can support to the hub such that if the hub (network device) also is compatible with/accepts such levels, the hub sends a random PSK to the spoke (remote/client device) to replace the temporary one and the new PSK is used to establish a new permanent tunnel. If not, the spoke tries the procedure with next highest levels it can support until both the spoke and the hub are configured at the highest levels of encryption, authentication and DH group using a random PSK generated by the hub. Thereafter, the hub iteratively runs traffic tests between the spoke and itself, reducing encryption/authentication levels at both sides until performance metrics (such as speed, for instance) are within acceptable limits, at which time a firewall policy is created and the VPN completed.

As can be readily appreciated, the prior process is highly manual, requiring the network administrator to manage and initiate several steps, while, in accordance with embodiments described herein, the proposed automated method reduces the burden on the network administrator by having network devices associated with the two sites quickly and automatically discover mutually available highest security levels for desired throughput and also adds the ability to randomize some of the parameters (e.g., key life timer and/or PSK).

Figure 4A:
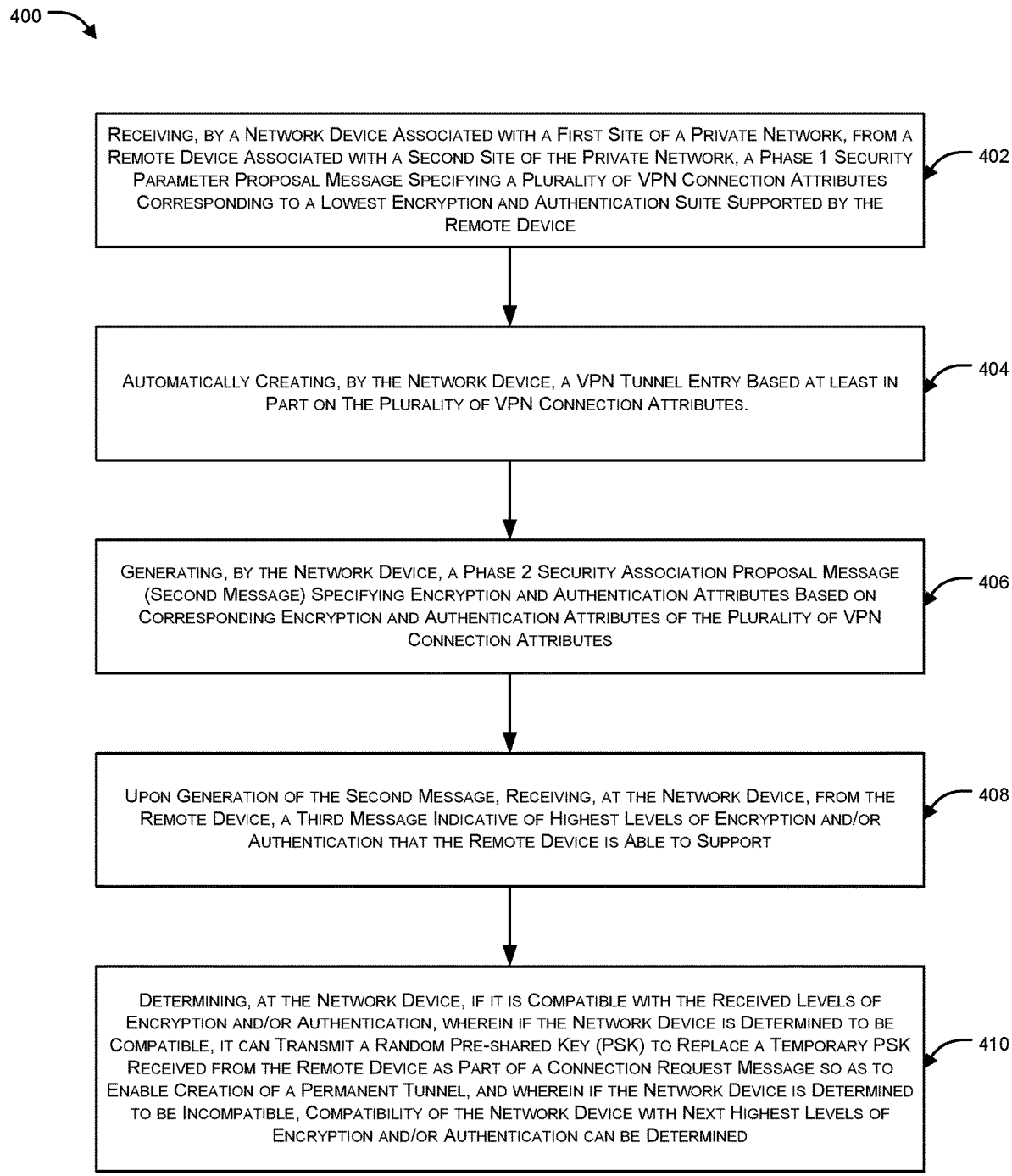
FIG. 4A is a high-level flow diagram illustrating automatic VPN establishment processing in accordance with an embodiment of the present invention.

FIG. 4A is a high-level flow diagram 400 illustrating automatic VPN establishment processing in accordance with an embodiment of the present invention.

In the context of the present example, the method for automatically establishing a virtual private network (VPN) connection includes, at step 402, receiving, by a network device associated with a first site (e.g., a hub) of a private network, from a remote device associated with a second site (e.g., a spoke) of the private network, a phase 1 security parameter proposal message specifying various VPN connection attributes corresponding to the lowest encryption and authentication suite supported by the remote device, and at step 404, automatically creating, by the network device, a VPN tunnel entry based at least in part on the various VPN connection attributes.

The method further includes, at step 406, generating, by the network device, a phase 2 security association proposal message (second message) specifying encryption and authentication attributes based on corresponding encryption and authentication attributes of the various VPN connection attributes.

Responsive to processing the second message by the remote device, at step 408, receiving, at the network device, from the remote device, a third message indicative of the highest levels of encryption and/or authentication that the remote device is able to support.

The method further includes, at step 410, determining, at the network device, if it is compatible with the received levels of encryption and/or authentication. When the network device is determined to be compatible with the encryption and/or authentication level proposed in the third message, then the network device transmits a random pre-shared key (PSK) to replace a temporary PSK received from the remote device as part of a connection request message so as to enable creation of a permanent tunnel. When the network device is determined to be incompatible with the encryption and/or authentication level proposed in the third message, then iteratively attempting to determine compatibility of the network device with the next highest level of encryption and/or authentication by the remote device trying the next highest level settings it can support until a match is found or no agreement is made. According to one embodiment, if no agreement can be made, between the two sites, the tunnel made using the temporary PSK can be destroyed and a message can be logged to notify the administrator regarding the issue.

In an aspect, the first set of VPN connection attributes can be selected from any or a combination of an IP address of the remote device, an FQDN of the remote device, a unique VPN connection name, a destination IP address, attributes of supported authentication, attributes of supported encryption, a randomized key life timer, a supported Diffie-Hellman (DH) group, and the temporary pre-shared key (PSK).

In another aspect, the remote device can configure the permanent tunnel based on the random PSK, the second message, and the connection request message.

In yet another aspect, the method can further include the steps of performing, at the network device, one or more connection speed tests between the remote device and destination to measure whether the connection speed between the two sites is sufficient to support desired business operations/communications between the two sites (e.g., based on a predetermined or configurable minimum speed threshold established by the administrator). When the speed test indicates the communication throughput between the two sites meets or exceeds the minimum speed threshold, the permanent tunnel can be finalized so as to complete the VPN connection establishment; otherwise, if the communication throughput is lower than the minimum speed threshold, levels of encryption and/or authentication can be reduced between the remote device and the network device and the speed test can be repeated iteratively until the minimum speed threshold is achieved.

In an aspect, the connection request message can be authorized before the VPN tunnel entry is created.

In another aspect, the network device can be any or a combination of a hub, a network security device, a router, and a gateway device.

Figure 4B:
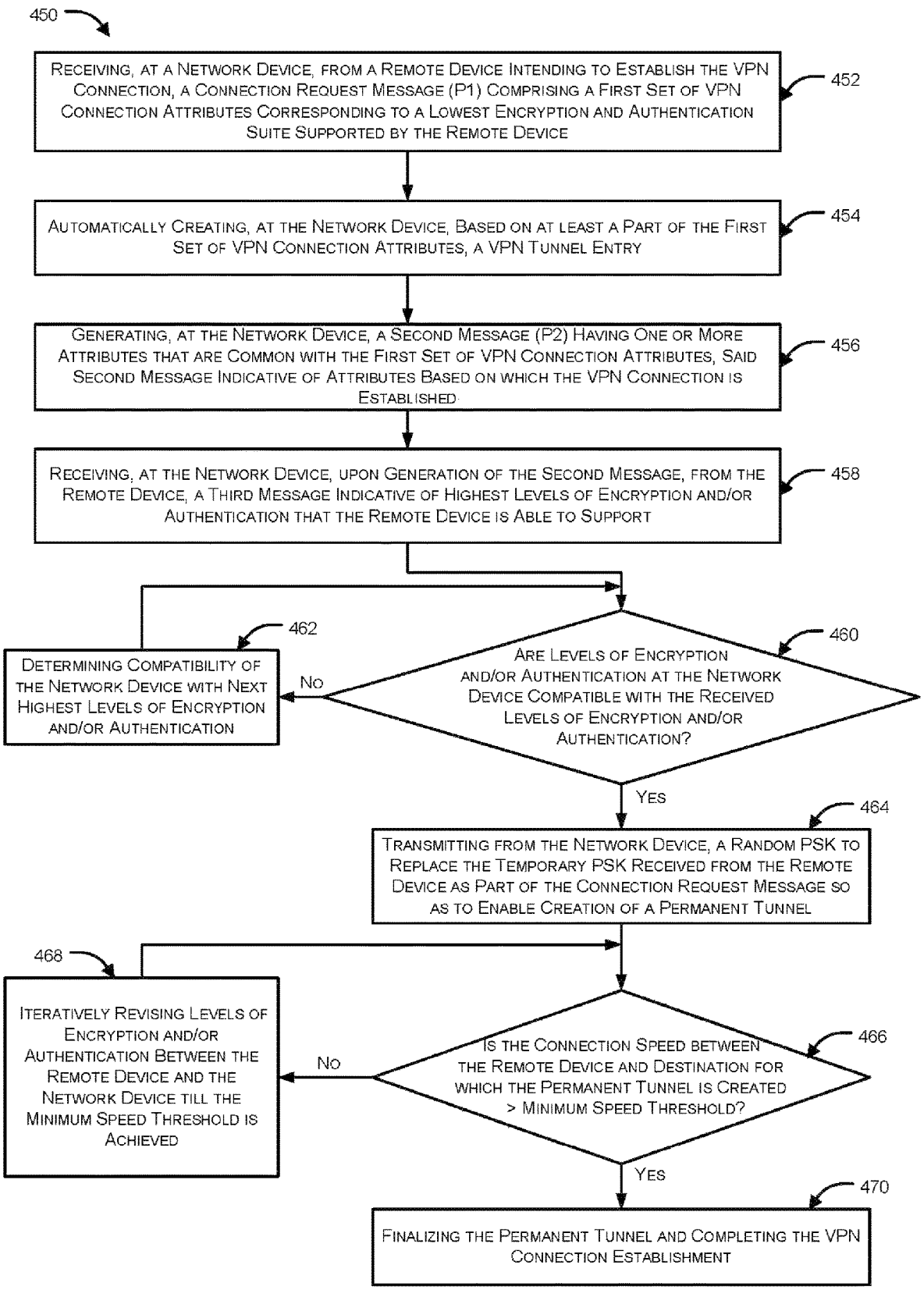
FIG. 4B is a more detailed flow diagram illustrating automatic VPN establishment processing, including performing automatic throughput testing of the established VPN connection in accordance with an embodiment of the present invention.

FIG. 4B is a more detailed flow diagram 450 illustrating automatic VPN establishment processing, including performing automatic throughput testing of the established VPN connection in accordance with an embodiment of the present invention.

In the context of the present example, the method for automatically establishing a virtual private network (VPN) connection includes, at step 452, receiving, at a network device, from a remote device intending to establish the VPN connection, a connection request message (P1) comprising a first set of VPN connection attributes corresponding to a lowest encryption and authentication suite supported by the remote device.

At step 454, the network device automatically creates a VPN tunnel entry based on at least a part of the first set of VPN connection attributes.

The method further includes, at step 456, generating, at the network device, a second message (P2) having one or more attributes that are in common with the first set of VPN connection attributes, the second message indicative of attributes based on which the VPN connection is established.

At step 458, responsive to the second message being processed by the remote device, the network device, receives from the remote device, a third message indicative of the highest levels of encryption and/or authentication that the remote device is able to support.

Further, the method includes, at decision block 460, determining whether levels of encryption and/or authentication supported by the network device are compatible with the received levels of encryption and/or authentication in the third message. If so, processing continues with step 464; otherwise, processing branches to step 452.

At step 462, it was determined (at decision block 460) that the network device was not compatible with the previous levels of encryption and/or authentication proposed by the remote device via the third message. As such, the remote device attempts to determine compatibility of the network device with its next highest levels of encryption and/or authentication and processing continues with step 460. This process will continue iteratively until a match is found or no agreement can be made. If no agreement can be made between the two sites, then the tunnel made using the temporary PSK can be destroyed and a message can be logged for the administrator to review.

At step 464, it was determined (at decision block 460) that the network device is compatible with the levels of encryption and/or authentication proposed by the remote device via the third message. As such, the network device transmits a random PSK to replace the temporary PSK received from the remote device as part of the connection request message so as to enable creation of a permanent tunnel.

At decision block 466, it is determined whether the connection speed between the two sites (i.e., the remote device and the hub) satisfies a predetermined or configurable minimum speed threshold. If so, then processing continues with step 470; otherwise, processing branches to step 468. In one embodiment this determination involves running a speed test between the two sites and comparing the communication throughput measured by the speed test to the minimum speed threshold.

At step 468, it has been determined (at decision block 466) that the connection speed between the two sites is not acceptable. As such, at step 468, iteratively revises levels of encryption and/or authentication between the remote device and the network device and reruns the speed test until the minimum speed threshold is achieved.

At step 470, it has been determined (at decision block 466) that the connection speed between the two sites is acceptable. As such, the network device finalizes the permanent tunnel and completes the VPN connection establishment.

Figure 5:
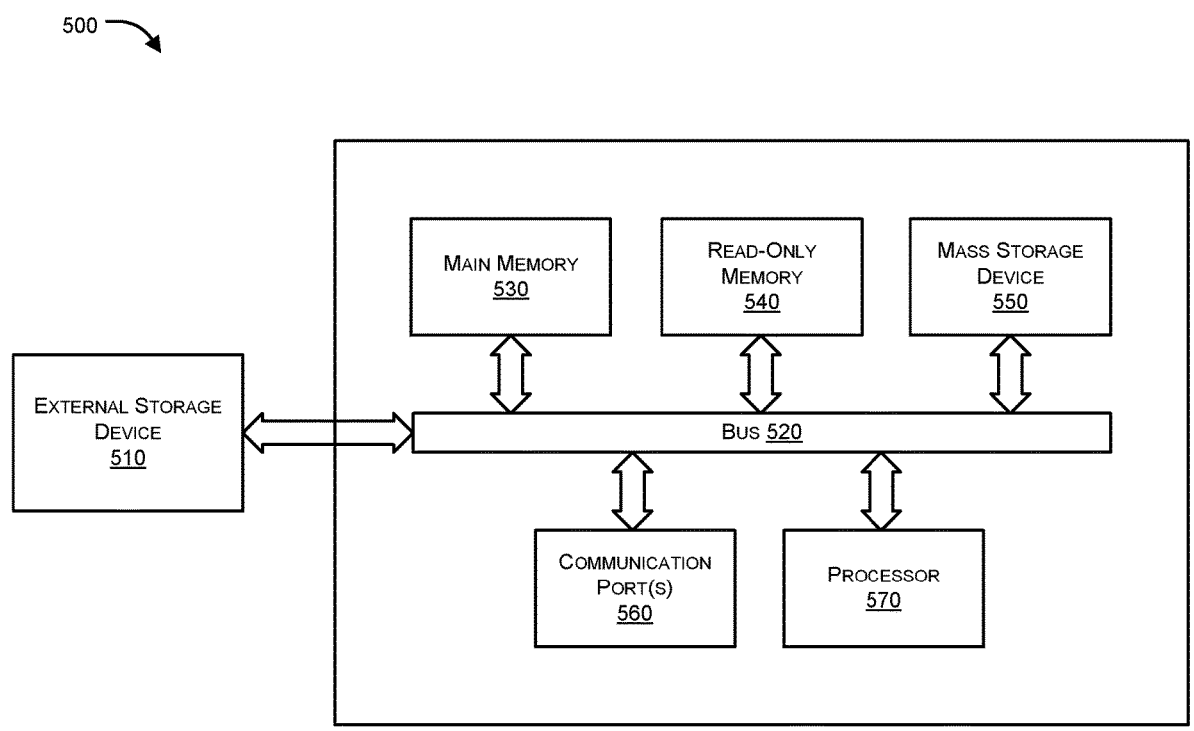
FIG. 5 illustrates an exemplary computer system in which or with which embodiments of the present invention may be utilized.

FIG. 5 illustrates an exemplary computer system 500 in which or with which embodiments of the present invention may be utilized. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Computer system 500 may be representative of all or a portion of the computing resources associated with a network device (e.g., a router or a network security device) associated with a remote site/spoke or a hub. Notably, components of computer system 500 described herein are meant only to exemplify various possibilities. In no way should exemplary computer system 500 limit the scope of the present invention.

In the context of the present example, computer system 500 includes an external storage device 510, a bus 520, a main memory 530, a read only memory 540, a mass storage device 550, communication port 560, and a processor 570. Those skilled in the art will appreciate that computer system 500 may include more than one processor and communication ports. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may fetch from memory and execute the various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system 500 connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g., start-up or BIOS instructions for processor 570. SANs and VSANs may also be deployed.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Computer system 500 may implement the techniques described herein using customized hard-wired logic, one or more ASICs or FPGAs, firmware or program logic which in combination with computer system 500 causes or programs computer system 500 to be a special-purpose machine. According to one embodiment, the techniques herein are performed by computer system 500 in response to processor 570 executing one or more sequences of one or more instructions contained in main memory 530. Such instructions may be read into main memory 530 from another storage medium, such as storage device 510 or 550. Execution of the sequences of instructions contained in main memory 530 causes processor 570 to perform the process steps described herein. In alternative embodiments, hard-wired circuitry may be used in place of or in combination with software instructions.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system 500. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method for automatically establishing a virtual private network (VPN) connection, the method comprising:
receiving, by a network device associated with a first site of a private network, from a remote device associated with a second site of the private network, a phase 1 security parameter proposal message specifying a plurality of VPN connection attributes corresponding to a lowest encryption and authentication suite supported by the remote device;
automatically creating, by the network device, a VPN tunnel entry based at least in part on the plurality of VPN connection attributes;
generating, by the network device, a phase 2 security association proposal message specifying encryption and authentication attributes based on corresponding encryption and authentication attributes of the plurality of VPN connection attributes;
responsive to processing of the phase 2 security association proposal message by the remote device, receiving, by the network device, from the remote device, a third message indicative of a highest level encryption and authentication suite that the remote device is able to support; and
determining, by the network device, whether the network device is compatible with the highest level encryption and authentication suite;
when said determining is affirmative, then transmitting, by the network device, a random pre-shared key (PSK) to replace a temporary PSK received from the remote device as part of a connection request message so as to enable creation of a permanent tunnel and establishment of the VPN connection; and
when said determining is negative, then compatibility of the network device with a lower level encryption and authentication suite is determined by the remote device iteratively reducing a proposed level of encryption and authentication suite until a match is found between the remote device and the network device.

2. The method of claim 1, wherein the plurality of VPN connection attributes are selected from any or a combination of an Internet Protocol (IP) address of the remote device, a fully qualified domain name (FQDN) of the remote device, a unique VPN connection name, a destination IP address, attributes of supported authentication, attributes of supported encryption, a randomized key life timer, a supported Diffie-Hellman (DH) group, and the temporary pre-shared key (PSK).

3. The method of claim 2, wherein the remote device configures the permanent tunnel based on the random PSK, the second message, and the connection request message.

4. The method of claim 2, the method further comprises:
performing, at the network device, a connection speed test between the remote device and the network device;
when the connection speed test indicates a connection speed between the remote device and the network device meets or exceeds a minimum speed threshold, then completing the VPN connection establishment by finalizing the permanent tunnel;
when the connection speed between the remote device and the network device is less than the minimum speed threshold, then a level of encryption or authentication is iteratively revised between the remote device and the network device until the minimum speed threshold is achieved.

5. The method of claim 1, wherein the connection request message is authorized before the VPN tunnel entry is created.

6. The method of claim 1, wherein the network device is any or a combination of a hub, a network security device, a router, and a gateway device.

7. A non-transitory computer-readable storage medium embodying a set of instructions, which when executed by one or more processors of a network device associated with a first site of a private network, causes the one or more processors to perform a method comprising:
receiving, from a remote device associated with a second site of the private network, a phase 1 security parameter proposal message specifying a plurality of VPN connection attributes corresponding to a lowest encryption and authentication suite supported by the remote device;
automatically creating a VPN tunnel entry based at least in part on the plurality of VPN connection attributes;
generating a phase 2 security association proposal message specifying encryption and authentication attributes based on corresponding encryption and authentication attributes of the plurality of VPN connection attributes;
responsive to processing of the phase 2 security association proposal message by the remote device, receiving, from the remote device, a third message indicative of a highest level encryption and authentication suite that the remote device is able to support; and
determining whether the network device is compatible with the highest level encryption and authentication suite;
when said determining is affirmative, then transmitting a random pre-shared key (PSK) to replace a temporary PSK received from the remote device as part of a connection request message so as to enable creation of a permanent tunnel and establishment of the VPN connection; and
when said determining is negative, then compatibility of the network device with a lower level encryption and authentication suite is determined by the remote device iteratively reducing a proposed level of encryption and authentication suite until a match is found between the remote device and the network device.

8. The non-transitory computer-readable storage medium of claim 7, wherein the plurality of VPN connection attributes are selected from any or a combination of an Internet Protocol (IP) address of the remote device, a fully qualified domain name (FQDN) of the remote device, a unique VPN connection name, a destination IP address, attributes of supported authentication, attributes of supported encryption, a randomized key life timer, a supported Diffie-Hellman (DH) group, and the temporary pre-shared key (PSK).

9. The non-transitory computer-readable storage medium of claim 8, wherein the remote device configures the permanent tunnel based on the random PSK, the second message, and the connection request message.

10. The non-transitory computer-readable storage medium of claim 8, wherein the method further comprises:
performing a connection speed test between the remote device and the network device;
when the connection speed test indicates a connection speed between the remote device and the network device meets or exceeds a minimum speed threshold, then completing the VPN connection establishment by finalizing the permanent tunnel;

when the connection speed between the remote device and the network device is less than the minimum speed threshold, then a level of encryption or authentication is iteratively revised between the remote device and the network device until the minimum speed threshold is achieved.

11. The non-transitory computer-readable storage medium of claim 7, wherein the connection request message is authorized before the VPN tunnel entry is created.

12. The non-transitory computer-readable storage medium of claim 7, wherein the network device comprises any or a combination of a hub, a network security device, a router, and a gateway device.

* * * * *